United States Patent [19]

Gründken et al.

[11] Patent Number: 4,673,079

[45] Date of Patent: Jun. 16, 1987

[54] TRANSFER STATION

[75] Inventors: Dieter Gründken, Lünen; Reinhold Brüggemann, Dortmund, both of Fed. Rep. of Germany

[73] Assignee: Gewerkschaft Eisenhütte Westfalia GmbH, Lünen, Fed. Rep. of Germany

[21] Appl. No.: 706,595

[22] Filed: Feb. 28, 1985

[30] Foreign Application Priority Data

Mar. 7, 1984 [DE] Fed. Rep. of Germany ....... 3408282

[51] Int. Cl.$^4$ ............................................. B65G 47/76
[52] U.S. Cl. .................................... 198/599; 198/606; 198/729
[58] Field of Search ............... 198/599, 606, 607, 729, 198/735, 841

[56] References Cited

U.S. PATENT DOCUMENTS

| 4,098,396 | 7/1978 | Stoppani et al. | 198/735 |
| 4,282,968 | 8/1981 | Temme | 198/735 |
| 4,512,459 | 4/1985 | Kerklies | 198/729 |

FOREIGN PATENT DOCUMENTS

| 1017084 | 10/1957 | Fed. Rep. of Germany | 198/729 |
| 2016247 | 10/1971 | Fed. Rep. of Germany | 198/729 |
| 2600999 | 7/1977 | Fed. Rep. of Germany | 198/606 |
| 2659855 | 8/1977 | Fed. Rep. of Germany | 198/606 |
| 2149395 | 12/1979 | Fed. Rep. of Germany | 198/606 |
| 1463764 | 2/1977 | United Kingdom | 198/606 |

Primary Examiner—Robert J. Spar
Assistant Examiner—Lyle Kimms
Attorney, Agent, or Firm—Neil F. Markva

[57] ABSTRACT

A transfer station assembly is provided for transferring mineral material from a longwall scraper-chain conveyor to a roadway scraper-chain conveyor. The transfer station includes a box frame, in which the upper run of the roadway conveyor is guided between the upper and lower runs of the longwall conveyor. Guide bars are provided for guiding the scrapers of the scraper assembly of the roadway conveyor within the box frame. The guide bars for the roadway conveyor are detachably secured to the box frame so as to be readily releasable and replaceable by other guide bars, whereby roadway conveyors of different types and/or widths can be connected to the box frame.

16 Claims, 11 Drawing Figures

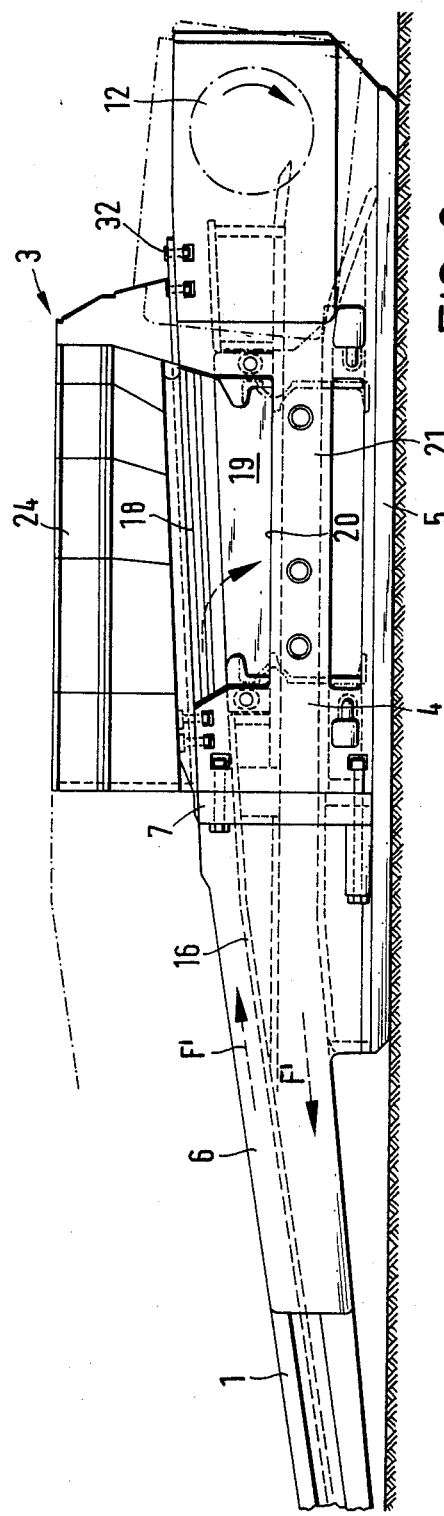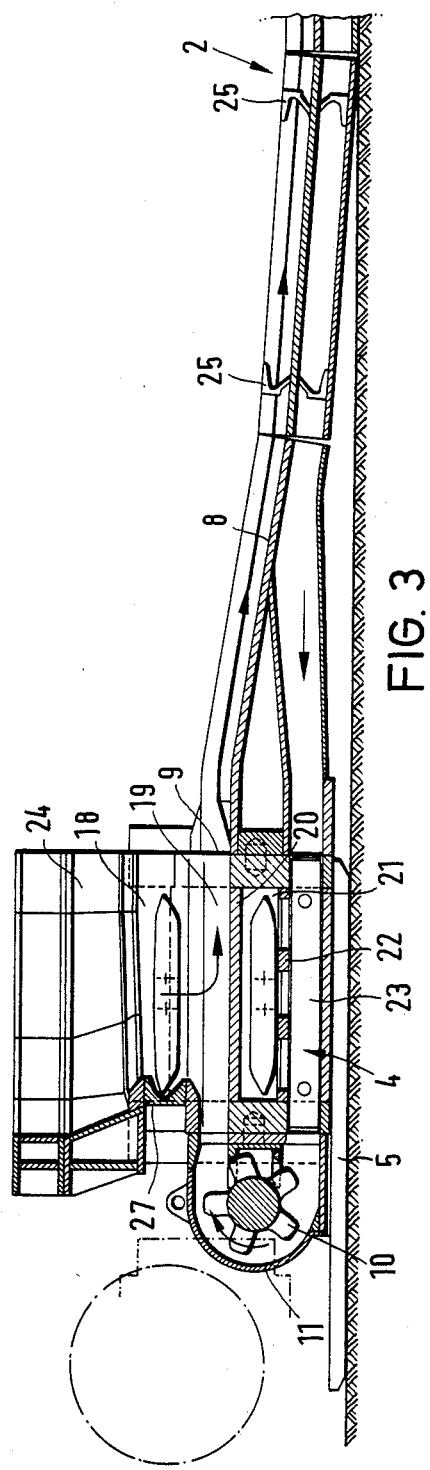

TRANSFER STATION

BACKGROUND TO THE INVENTION

This invention relates to an assembly for transferring mineral material from a longwall conveyor to a roadway conveyor in a mine working.

A typical transfer station assembly comprises a box frame which incorporates the drive frames of the longwall conveyor and the roadway conveyor, which conveyors extend at right-angles to one another. The individual runs of the longwall conveyor and the roadway conveyor cross one another inside the box frame, with the upper run of the roadway conveyor disposed between the upper and lower runs of the longwall conveyor. The arrangement is such that, with the help of a deflector, mineral material is laterally discharged from the upper run of the longwall conveyor on to the immediately subjacent upper run of the roadway conveyor. (See DE-AS No. 2 237 976, DE-AS No. 2 600 999 and DE-OS No. 2 659 855).

The scraper-chain conveyors, which normally constitute the longwall and roadway conveyors, each consist of a line of interconnected channel sections (pans), the profiled side walls of which form guides for the scrapers which are connected to, for example, a central chain or a pair of central chains. The guides for the profiled ends of the scrapers are extended from the line of channel sections of the two conveyors into the box frame. At that side of the upper run of the longwall conveyor that lies opposite the deflector, there is no profiled guide, so that the mineral can be discharged laterally.

The aim of the invention is to provide a transfer station having a box frame that can be used with roadway conveyors which are of different widths and/or which are provided by different manufacturers.

SUMMARY OF THE INVENTION

The present invention provides a transfer station assembly for transferring mineral material from a longwall scraper-chain conveyor to a roadway scraper-chain conveyor. The transfer station assembly comprising a box frame in which the upper run of the roadway conveyor is guided between the upper and lower runs of the longwall conveyor, a deflector arranged on the box frame for laterally discharging mineral material from the upper run of the longwall conveyor on to the upper run of the roadway conveyor, and guide bars for guiding the scrapers of the scraper assembly of the roadway conveyor within the box frame. The guide bars are detachably secured to the box frame so as to be readily releasable and relaceable by other guide bars, whereby roadway conveyors of different types and/or widths can be connected to the box frame.

The box frame is accordingly so constructed that it can be used for all available widths and types of roadway scraper-chain conveyor. All that is required is to provide suitable guide bars for the various roadway conveyors, and to incorporate them in the required manner. The ease with which the guide bars can be exchanged, in conjunction with the lay-out of the box frame, enables the various roadway conveyors to be connected to the box frame, and thus permits simple adaptation to suit various widths and/or types of roadway conveyor, and at the same time enables conversion to suit the box frame to be carried out. It will be understood that the box frame is designed to cater for the greatest possible width of roadway conveyor that may be provided, and that adaptation to suit roadway conveyors of smaller width can be carried out by simply changing the guide bars. The guide bars are expediently designed as profiled filler elements of various widths, the guide bars filling up all the space in the box frame which is not required to accommodate the scraper assembly of the roadway conveyor. If necessary, this can be accomplished by inwardly off-setting the profiled bars.

Advantageously, the guide bars are secured to the box frame by means of bolts and mortise joints.

Preferably, the box frame includes a plate which defines the floor of the roadway conveyor, and the guide bars for the upper run of the roadway conveyor each has a guide rib arranged at a predetermined distance above said plate, the guide ribs defining, together with said plate, profiled guide ducts for the scrapers of the scraper assembly of the roadway conveyor. Conveniently, the guide ribs are of substantially trapezoidal cross-section.

In a preferred embodiment, each of the upper run guide bars includes a horizontal limb. Advantageously, the horizontal limb of each upper run guide bar is braced on a respective support element, the support elements being fixed to said plate, and being spaced apart laterally by a distance greater than the width of the channel sections of the widest roadway conveyor that is to be connected to the box frame. The upper run guide bars may consist of substantially right-angled profiled bars. Preferably, the horizontal limbs of the upper run guide bars are fixed to the respective support elements by means of vertical bolts. Each of the support elements may be a rectangular bar. Conveniently, each of the support elements is provided with a pocket for receiving the head of the associated bolt, said pockets being open at the side.

Advantageously, each of the upper run guide bars includes a vertical limb, the vertical limbs supporting the guide bars on said plate. Preferably, the box frame has frame walls which project beyond said plate, and the support elements bear against the frame walls. At least the guide bars disposed at the longwall side of the box frame may be provided with connecting means, such as bolt holes, for attaching the roadway conveyor.

Preferably, the guide bars for the lower run of the roadway conveyor are constituted by simple flat or rectangular bars, which are attached to wall parts of the box frame by means of horizontal bolts.

In a preferred embodiment, the box frame is provided with a guide bar for guiding the scrapers of the scraper assembly of the longwall conveyor when said scrapers are in the upper run, said guide bar being detachably secured to the lower face of the deflector so as to be readily releasable and replaceable by another guide bar. Advantageously, said guide bar is secured to the deflector by bolts and mortise joints. This guide bar serves for guiding the scrapers in the upper run of the longwall conveyor at one side within the box frame. This guide bar can easily be replaced when worn, so that the box frame can be adapted to suit different types of longwall conveyor.

BRIEF DESCRIPTION OF THE DRAWINGS

A transfer station constructed in accordance with the invention will now be described, by way of example, with reference to the accompanying drawings, in which:

FIG. 2 is a cross-section taken on the line II—II of FIG. 1;

FIG. 3 is a cross-section taken on the line III—III of FIG. 1;

DESCRIPTION OF PREFERRED EMBODIMENT

Figure 1:
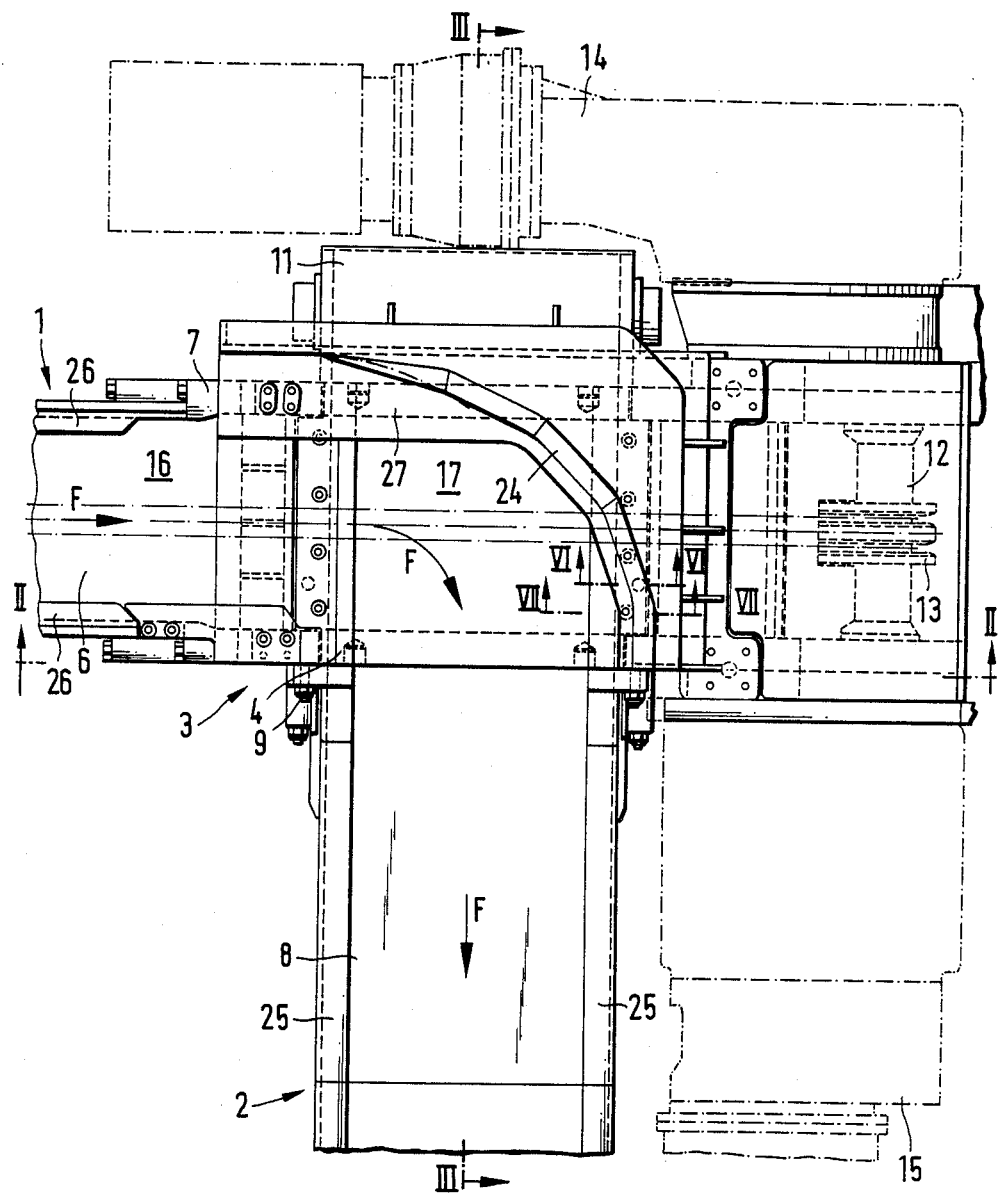
FIG. 1 is a plan view of the transfer station.

Referring to the drawings, FIG. 1 shows a longwall scraper-chain conveyor 1, and a roadway scraper-chain conveyor 2 extending at right-angles thereto in the longwall/roadway transition zone of an underground mine working. Preferably, each of the conveyors 1 and 2 is a center or double-center scraper-chain conveyor. A transfer station 3 is positioned in the transition zone where the conveyors 1 and 2 meet, the transfer station being effective to transfer mineral material from the longwall conveyor 1 on to the roadway conveyor 2. The direction of flow of the mineral material is indicated by the arrows F. The transfer station 3 includes a so-called box frame 4, which incorporates, in an enclosed unit, the drive frames at the adjacent ends of the two conveyors 1 and 2.

The box frame 4 includes a base plate 5, to which the components of the system are secured. The longwall conveyor 1 is connected to the box frame 4 by way of an intermediate channel section (adapter pan) 6. The upwardly-sloping adapter pan 6 is secured to the adjacent end face of the box frame 4 by flanges and bolts (not shown). Similarly, the roadway conveyor 2 is connected to the box frame 4 by way of an adapter pan 8. The upwardly-sloping adapter pan 8 is secured to the adjacent end face box frame 4, at 9, by flanges and bolts. A sprocket drum 10 is mounted in a housing 11 positioned at the opposite side of the box frame 4 to the adapter pan 8. The sprocket drum 10 is an idler drum, and serves to change the direction of travel of the scraper-chain assembly of the roadway conveyor 2, the scraper-chain assembly passing through the box frame 4. A drive drum 12 (see FIG. 1) for the longwall conveyor 1 is mounted in the box frame 4 at that side thereof opposite to the adapter pan 6. The two chains of the longwall conveyor 1, which is designed as a double-center scraper-chain conveyor, pass round the sprockets of the drive drum 12. The drive drum 12 is driven by two drive drum units 14 and 15, the drive unit 14 being arranged parallel to the longwall conveyor 1, and the drive unit 15 being arranged parallel to the roadway conveyor 2. The two drive units 14 and 15 are secured to the box frame 4 by flanging at the two opposite sides thereof.

The floor plate 16 of the adapter pan 6 of the longwall conveyor 1 extends into the box frame 4 beyond a plate 17 solidly incorporated in the box frame. Thus, the upper (conveying) run 18 of the longwall conveyor 1 is located within the box frame 4 above the plate 17. The upper (conveying) run 19 of the roadway conveyor 2 is located below the longwall conveyor upper run 18 in the box frame 4. The bottom of the upper run 19 of the roadway conveyor 2 is defined, in this region, by a plate 20 fixed to the box frame 4. The lower run 21 of the longwall conveyor 1 lies below the plate 20. The bottom of this lower run 21 is defined by a plate 22 fixed to the box frame 4. The lower run 23 of the roadway conveyor 2 is located between the plate 22 and the base plate 5 of the box frame 4. Thus, the upper (conveying) run 18 of the scraper assembly of the longwall conveyor 1 passes through the box frame 4. The scraper assembly then passes round the drive drum 12, and returns, in the lower run 21, through the box frame 4 in the opposite direction. This movement of the scraper assembly of the longwall conveyor 1 is indicated by the arrows F' in FIG. 2. Similarly, as shown in FIG. 3, the lower run 23 of the scraper assembly of the roadway conveyor 2 passes through the box frame 4. This scraper assembly then travels upwardly round the drum 10; and, in the upper run 19 (which is disposed between the upper and lower runs 18 and 21 respectively of the longwall conveyor), returns through the box frame 4 in the opposite direction.

A curved deflector 24 is mounted on the upper face of the box frame 4, the deflector being effective to divert and discharge the mineral material carried in the upper run 18 of the longwall conveyor 1 laterally on to the upper run 19 of the roadway conveyor 2.

Figure 10:
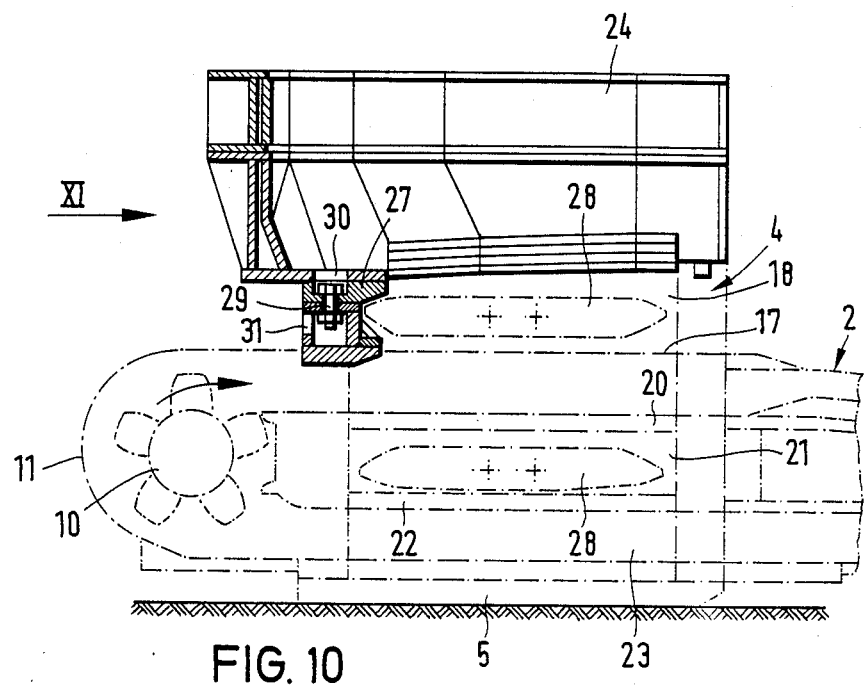
FIG. 10 is a cross-section taken on the line X—X of FIG. 11, and showing the deflector together with the guide bar arranged at its lower face.
Figure 11:
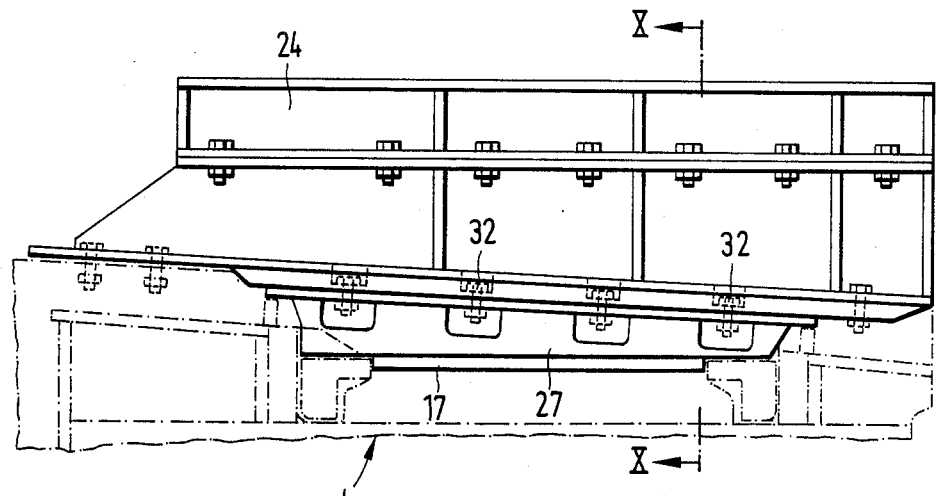
FIG. 11 is a view in the direction indicated by the arrow XI in FIG. 10.

Within the channel sections of the two scraper-chain conveyors 1 and 2, the ends of the scrapers move in profiled guides defined by the (generally sigma-shaped) side walls of the channel sections. The sigma-shaped profiles of side walls of the channel sections of the roadway conveyor 2 are indicated at 25 in FIG. 3, and the sigma-shaped profiles of the channel sections of the longwall conveyor 1 are illustrated at 26 in FIG. 1. The side wall 26 of the channel section adjacent to the box frame 4, which side wall is adjacent to the drum 10, is extended within the box frame, so that the scrapers of the scraper assembly of the longwall conveyor 1 are guided at one side on their way to the drive drum 12. This side wall extension is constituted by a profiled guide bar 27 which (see FIG. 10) is releasably secured to the lower face of the deflector 24, and can, therefore, be readily replaced. FIG. 10 shows in dash-dot lines the scrapers 28 of the scraper assembly of the longwall conveyor 1, which scrapers are guided, in the upper run 18, within the box frame 4. The guide bar 27 is a stable, profiled bar, which has the same scraper guide profile as the channel section side wall guide portions. As shown in FIG. 10, the guide bar 27 is a substantially box-shaped profiled bar, which is secured to the lower face of the deflector 24 by means of vertical bolts 29. The bolts 29 lie within the guide bar 27, the bolt heads and the nuts being accessible through openings 30 and 31 respectively.

The entire deflector 24 is releasably secured to the box frame 4 by means of bolts 32 (see FIG. 2). After these bolts 32 have been loosened, the deflector 24 (together with the guide bar 27) can be lifted away. The guide bar 27 can then be detached from the deflector 24 by removing the bolts 29. The ease with which the guide bar 27 can be exchanged enables differently-profiled guide bars (which can be suited to the different longwall conveyors) to be connected to the deflector 24. Thus, it is possible to use the box frame 4 with longwall conveyors 1 of the same width but of differing manufacture.

No scraper guide is provided for the upper run 18 of the scraper assembly of the longwall conveyor 1 at that side opposite the guide bar 27, so that a mineral material can be discharged laterally on to the upper run 19 of the roadway conveyor 2 with the help of the deflector 24.

Roadway conveyors 2 of differing widths and/or of differing manufacture (that is to say with differing profiled guides for the scrapers) can be built on to the box frame 4. The scrapers of the roadway conveyor 2 are guided in the box frame 4 on guide bars in both upper and lower runs; these guide bars being releasably fixed to the box frame and being easily exchangeable to suit the particular width and/or type of raodway conveyor. This arrangement will now be described in detail with reference to FIGS. 4 to 9.

Figure 4:
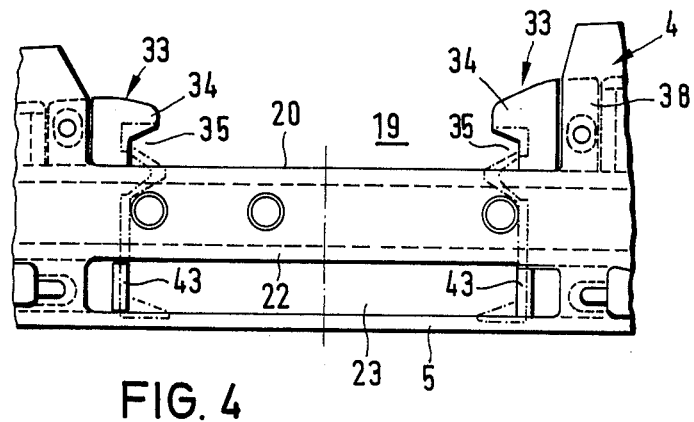
FIGS. 4 and 5 are end elevations, showing parts of the box frame of the transfer station, looking in the direction of the longitudinal axis of the associated roadway conveyor.

FIG. 4 shows two guide bars 33, which serve to guide the scrapers in the upper run 19 of the roadway conveyor 2, within the box frame 4. In this instance, the guide bars 33 are of similar form, each having a guide rib 34 and a guide duct 35. The guide ribs 34 are of roughly trapezoidal cross-section, and are arranged at a distance above the plate 20 forming the floor plate of the roadway conveyor. Each guide rib 34 forms, together with the plate 20, the associated guide duct 35. The scrapers of the roadway conveyor 2 are guided, by their correspondingly profiled ends, in the guide ducts 35. As shown in particular in FIGS. 6 and 7, each guide bar 33 is constituted by a horizontal limb 36 and a vertical limb 36', the latter bearing against the plate 20. The horizontal limbs 36 of the guide bars 33 are braced on rectangular support elements 37, which extend beyond the plate 20. The box frame 4 has walls 38 which project beyond the plate 20. The support elements 37 are fixed in the corners between the plate 20 and the walls 38, and form bearings for the limbs 36 of the guide bars 33. The limbs 36 of the guide bars 33 are fixed to the support elements 37 by means of vertical bolts 39 (see FIG. 7) and mortise joints 40 (see FIG. 6), the mortise joints being arranged between the bolts 39. The support elements 37 are provided with pockets 41, open at the side, into which the heads of bolts 39 are introduced. The bolts 39 pass through bolt holes in the limbs 36, and their nuts 42 are counter-sunk into recesses in the upper faces of the limbs 36.

Figure 5:
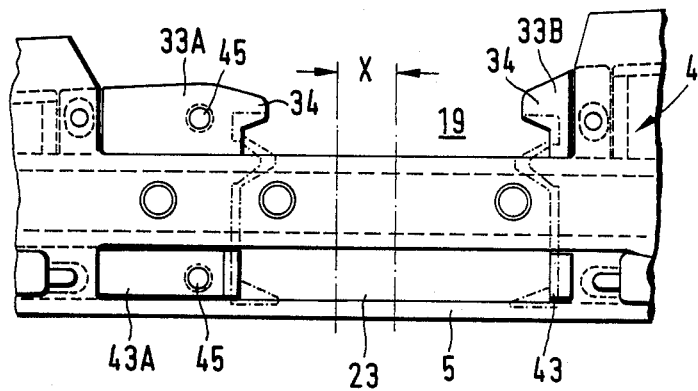

The support elements 37 are separated, at the opposite sides of the upper run 19, by a distance that is greater than the width of the channel sections of the widest roadway conveyor 2 which may be connected to the box frame 4. If a different roadway conveyor, having different profiled scraper guides 35, is built on to the box frame 4, the guide bars 33 can be readily exchanged for other guide bars which have profiled guides suited to this new roadway conveyor. Thus, if a roadway conveyor of smaller width is built on to the box frame 4, the profiled bars 33 of FIG. 4 are replaced by other profiled bars suited to this new roadway conveyor. For example, FIG. 5 shows two profiled bars 33A and 33B, which can be used when the roadway conveyor 1 is of smaller width. The profiled bar 33A has a considerably greater width than the corresponding profiled bar 33 of FIG. 4, whereas the profiled bar 33B has a smaller width than the corresponding profiled bar 33. The space between the two profiled bars 33A and 33B is determined by the width of the new roadway conveyor.

When the profiled bars of different widths are used, the central axis of the roadway conveyor to be built on to the box frame 4 shifts (for example, with the bars 33A and 33B shown in FIG. 5, the central axis moves to the right by a distance X). If the roadway conveyor is of an intermediate width, profiled bars 33A and 33B of equal width can be provided so that off-setting of the central axis of the roadway conveyor does not occur. It will be seen that the profiled bars 33, 33A and 33B also constitute filler elements which fill up all the space in the upper run 19 of the box frame 4 which is not required by the scraper assembly of the roadway conveyor. The securing of the profiled bars 33 by means of the bolts 39 permits rapid assembly and dismantling of these bars when the deflector 24 is removed.

Figure 8:
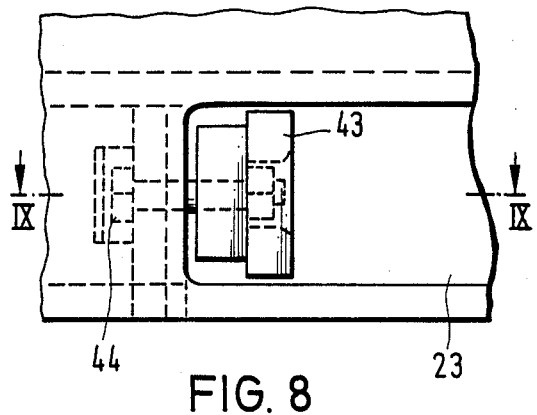
FIG. 8 is a side elevation of an individual guide bar in the lower run of the roadway conveyor within the box frame.
Figure 6:
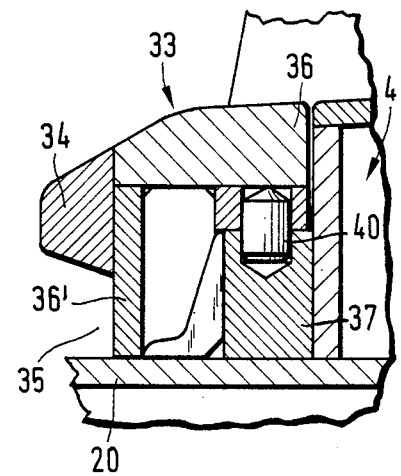
FIGS. 6 and 7 are partial cross-sections taken on the lines VI—VI and VII—VII respectively of FIG. 1.
Figure 9:
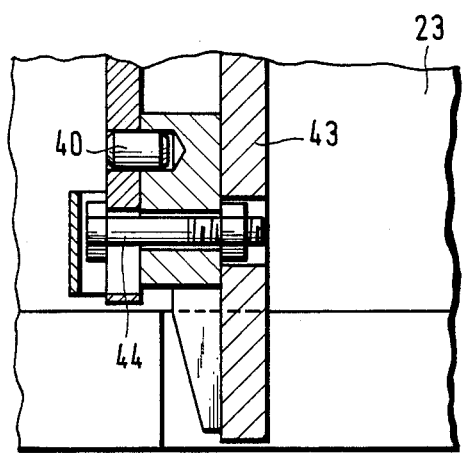
FIG. 9 is a cross-section taken on the line IX—IX of FIG. 8.
Figure 7:
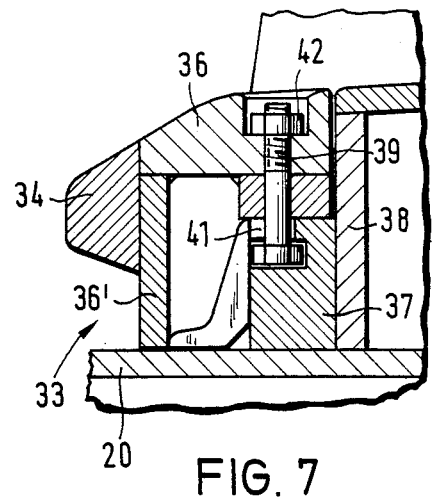

As shown in FIGS. 4, 5, 8 and 9, simple flat or rectangular bars 43 are used for guiding the scrapers of the roadway conveyor 2 in the lower run 23 within the box frame 4. The rectangular bars 43 are releasably secured to the box frame 4 by means of horizontal bolts 44 and horizontal mortise joints 40, the mortise joints being disposed between the bolts 44. To match the particular width of roadway conveyor 2, the guide bars 43 also have differing widths. FIGS. 4, 8 and 9 illustrate two relatively narrow guide bars 43, which are used with a roadway conveyor 2 of the greatest possible width. Where the roadway conveyor is of smaller width, for example as shown in FIG. 5, use is made of a correspondingly wider guide bar 43A at one side, the axis of the roadway conveyor being displaced by the distance X. Here again, the guide bars 43 or 43A constitute filler elements which, fill up all the space in the lower run 23 of the box frame 4 which is not required by the scaper assembly of the roadway conveyor. The arrangement is such that guide bars that are wider at the longwall side than at the roadway side are used only when the roadway conveyor has a width less than predetermined width. In all other cases, guide bars of equal width are provided at the left and right in both the upper and lower runs. This means that the axis of the roadway conveyor is only off-set when the roadway conveyor used has a width less than the predetermined width.

The upper run 18 of the longwall conveyor 1 that is disposed within the box frame 4 is open towards the subjacent upper run 19 of the roadway conveyor 2. The upper run 18 is then simply bridged by the guide bar 27 attached to the deflector 24. It will be understood that the box frame 4 is so designed that different widths or types of roadway conveyor can be mounted on it. As shown in FIG. 5, at least the guide bars 33A and 43A that are arranged at the longwall side can be provided with connecting means, in particular bolt holes 45, for attaching the adapter pan 8 of the roadway conveyor 2.

We claim:

1. A transfer station assembly for transferring mineral material from a longwall scraper-chain conveyor to a roadway scraper-chain conveyor, each of the scraper-chain conveyors including an endless scraper assembly having a plurality of scrapers attached to endless chain means, said assembly comprising:

(a) a box frame including means for guiding an upper run of the roadway conveyor between upper and lower runs of the longwall conveyor, (b) deflector means arranged on the box frame for laterally discharging mineral material from the upper run of the longwall conveyor on to the upper run of the roadway conveyor, (c) first guide bar means for guiding the scrapers of the scraper assembly of the roadway conveyor within the box frame, (d) said first guide bar means being detachably secured to the box frame to be readily releasable and replaceable whereby roadway conveyors of different types and/or widths can be connected to the box frame, and (e) second guide bar means for guiding the scrapers of the scraper assembly of the longwall conveyor, (f) said second guide bar means being detachably secured to a lower face of the deflector means to be readily releasable and replaceable.

2. An assembly according to claim 1, wherein
the first guide bar means includes bolts and mortise joints which secure guide bars to the box frame.

3. An assembly according to claim 1, wherein
the box frame includes a plate which defines the floor of the roadway conveyor.

4. An assembly according to claim 3, wherein
the first guide bar means includes guide bars for the upper run of the roadway conveyor,
each guide bar has a guide rib arranged at a predetermined distance above said plate,
the guide ribs defining, together with said plate, profiled guide ducts for the scrapers of the scraper assembly of the roadway conveyor.

5. An assembly according to claim 4, wherein
the guide ribs are of substantially trapezoidal cross-section.

6. An assembly according to claim 1, wherein
the first guide bar means include guide bars in an upper run and each bar having a horizontal limb.

7. An assembly according to claim 6, wherein
the horizontal limb of each upper run guide bar is braced on a respective support element,
the support elements being fixed to a plate and being spaced apart laterally by a distance greater than the width of the widest roadway conveyor that is to be connected to the box frame.

8. An assembly according to claim 7, wherein
the horizontal limbs of the upper run guide bars are fixed to the respective support elements by vertical bolts.

9. An assembly according to claim 8, wherein
each of the support elements includes a pocket for receiving the head of the associated bolt,
said pockets being open at the side.

10. An assembly according to claim 7, wherein
each of the support elements is a rectangular bar.

11. An assembly according to claim 7, wherein
each of the upper run guide bars includes a vertical limb,
the vertical limbs supporting the guide bars on said plate.

12. An assembly according to claim 7, wherein
the box frame has frame walls which project beyond said plate, and
the support elements bear against the frame walls.

13. An assembly according to claim 1, wherein
said first guide bar means includes at least guide bars disposed at a longwall side of the box frame,
said guide bars being provided with connecting means for attaching the roadway conveyor.

14. An assembly according to claim 13, wherein
bolt holes comprise said connecting means.

15. An assembly according to claim 1, wherein
the first guide bar means includes guide bars for a lower run of the roadway conveyor,
said guide bars being rectangular bars.

16. An assembly according to claim 1, wherein
the first guide bar means includes horizontal bolts which attach guide bars in a lower run of the roadway conveyor to wall parts of the box frame.

* * * * *